United States Patent
Kuwahara

[11] Patent Number: 5,855,256
[45] Date of Patent: Jan. 5, 1999

[54] GUIDE FRAME FOR EDDY CURRENT TYPE BREAKING SYSTEM

[75] Inventor: Tohru Kuwahara, Kawasaki, Japan

[73] Assignee: Isuzu Motors Limited, Tokyo, Japan

[21] Appl. No.: 706,595

[22] Filed: Sep. 5, 1996

[30] Foreign Application Priority Data

Sep. 8, 1995 [JP] Japan ..................................... 7-257016

[51] Int. Cl.$^6$ ............................... B60L 7/28; H02K 49/02
[52] U.S. Cl. .......................... 188/164; 188/158; 188/267; 310/93; 310/105
[58] Field of Search .................................. 188/158, 162, 188/267, 159, 161; 310/105, 93

[56] References Cited

U.S. PATENT DOCUMENTS 5,303,802  4/1994  Kuwahara .

Primary Examiner—Peter M. Poon
Attorney, Agent, or Firm—John E. Toupal; Harold G. Jarcho

[57] ABSTRACT

A guide frame for an eddy current type braking system includes a brake drum connected to a rotary shaft; a stationary pole piece frame formed of a non-magnetic material, disposed within the brake drum and retaining a plurality of ferromagnetic plates opposed to an inner surface of the brake drum; and magnet support rings formed of a magnetic material and retaining permanent magnets opposed to the ferromagnetic plates. An outer surface and an inner peripheral surface of each ferromagnetic plate is displaced in a direction parallel to the axis of the brake drum, and an axial center of the outer peripheral surface of the ferromagnetic plates is substantially radially aligned with an axial center of the brake drum.

18 Claims, 3 Drawing Sheets

GUIDE FRAME FOR EDDY CURRENT TYPE BREAKING SYSTEM

BACKGROUND OF THE INVENTION

The invention relates generally to an eddy current type braking system reduction device for assisting a frictional brake of a large vehicle, and more particularly, to a system in which magnet support rings retain permanent magnets in annularly equally spaced positions within a brake drum.

As disclosed, for example, in Japanese Patent Application Laid-Open No. 86061/1991, an eddy current type braking system in which a magnet support ring retaining a number of magnets is switched between a braking position opposed to an inner surface of the brake drum and a non-braking position withdrawn outwardly from the brake drum. In addition, Japanese Patent Application Laid-Open No. 88867/1992, discloses an eddy current type braking system in which a magnet support ring is rotatably disposed within a brake drum, and the ring is rotated forwardly and reversely by a half-array pitch of the magnets to thereby switch between a braking position and a non-braking position. This unit is shorter in full length (dimension in an axial direction of the brake drum) than that of the former, and if the axial width of the magnets is enlarged, it is possible to increase a braking performance.

However, in a large size truck or a large size bus, a drive transmission system often fails to provide much space for mounting of an eddy current type reduction device. It is therefore preferred that the eddy current type reduction device be made as small as possible. Miniaturization of the eddy current device, however, creates problems in connection with magnet width or desired alignment between a brake drum and pole pieces retained on an annular frame. That is, since the axial center of the ferromagnetic pole pieces on the guide frame do not align with the axial center of the brake drum, an uneven heat distribution pattern is produced, and thermal deformation tends to occur in the vicinity of the open end of the brake drum.

SUMMARY OF THE INVENTION

The above problems are alleviated by the present invention in which a guide frame provides axial alignment between an axial center of a brake drum and an axial center of an outer surface of each ferromagnetic pole piece plate. To improve heat distribution, an outer surface and an inner surface of each ferromagnetic pole piece plate are axially (axial direction of a brake drum) displaced from each other such that an axial center of the outer surface of each ferromagnetic plate is substantially aligned with an axial center of the brake drum.

In cases where an inner end of a brake drum is connected to spokes radially extending from a boss portion, the axial center of the outer surface of the ferromagnetic plates can be slightly displaced from the axial center of the brake drum toward the inner end of the brake drum. That arrangement compensates for the difference in heat diffusion characteristics between the open outer end and the inner end of the brake drum. However, in cases where there is enough space in the open outer end of the brake drum, the width of the brake drum is increased to enlarge a heat radiating area of the brake drum, and the axial centers of the outer surface of the pole piece plates are slightly displaced from the axial center of the brake drum toward the open outer end of the brake drum. Again, that arrangement compensates for the difference in heat diffusion characteristics between the open outer end and the inner end of the brake drum.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
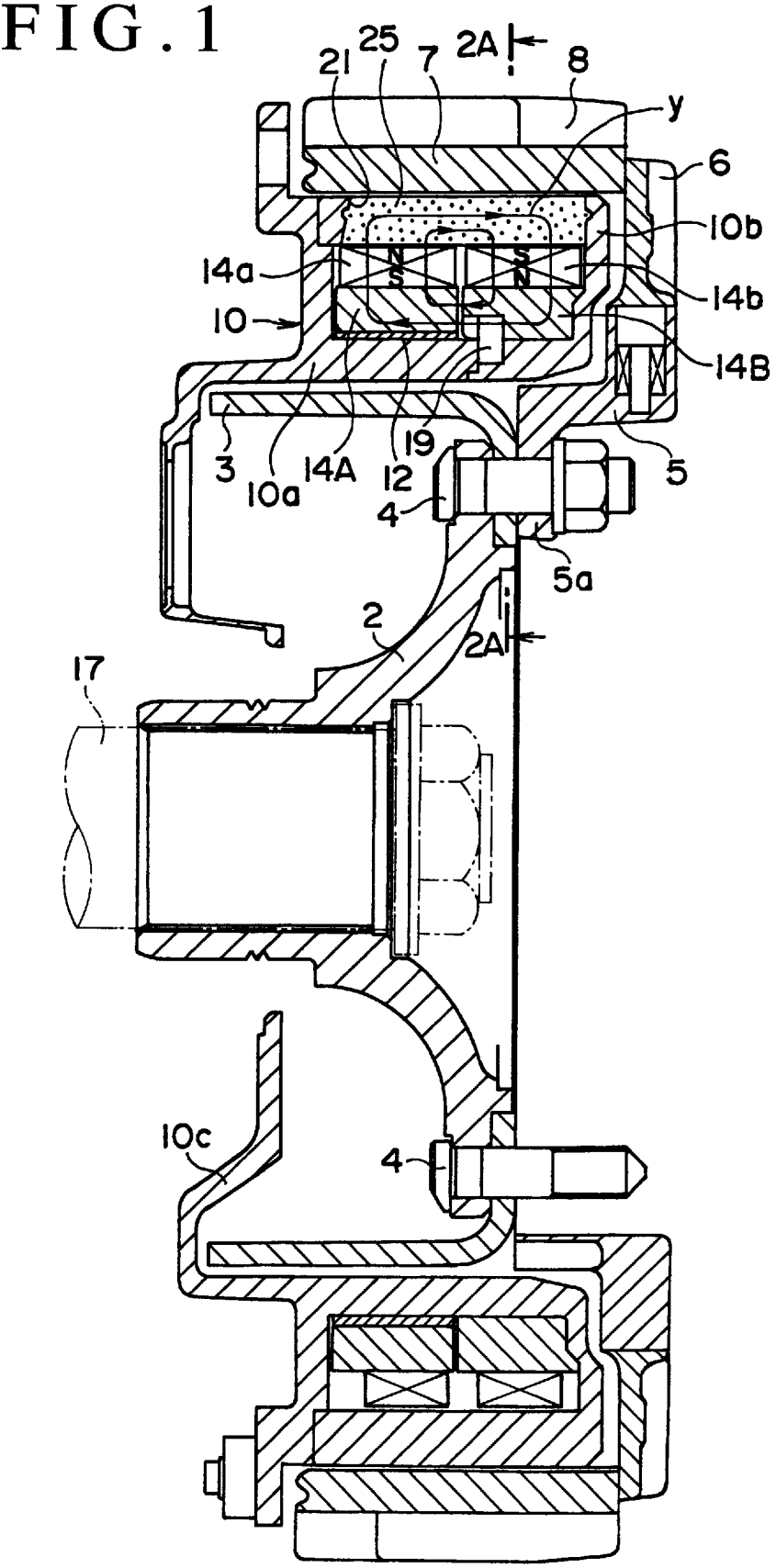
FIG. 1 is a sectional front view showing a non-braking condition for an eddy current type braking device according to the invention.

The eddy current type braking system according to the present invention includes a brake drum 7 formed of a conductive material and connected to a rotary output shaft 17 of a vehicle transmission or speed change gear (not shown). A stationary guide frame 10 is formed of a non-magnetic material and disposed within the brake drum 7. Supported by the frame 10 in an annular free space are a rotatable magnet support ring 14A and a stationary magnet support ring 14B. The brake drum 7 has a flange 5a projecting from a boss portion 5 and attached to a mounting flange 2 keyed to the rotary shaft 17. Securing the flange 2 to the flange 5a and an end wall portion of a parking brake drum 3 are a plurality of bolts 4. An inner end of the brake drum 7 is provided with cooling fins 8 and is connected by spokes 6 radially extending from the boss portion 5.

The guide frame 10 has a free space of rectangular shape in section and is formed by a tubular body 10a having a L-shape section connected by, for example, bolts to a tubular body 10b having an inverted L-shape section. Extending from the guide frame 10 is a mounting plate 10c secured, for example, to a gear box of the vehicle transmission, by suitable means (not shown). Annularly spaced apart ferromagnetic pole piece plates 25 are retained in a plurality of peripherally equally spaced openings 21 (FIG. 2) provided on the outer peripheral wall of the guide frame 10. Preferably, the ferromagnetic plates 25 are inserted into the openings 21 when the tubular body 10b is molded.

The magnet support ring 14A is formed of a magnetic material and is rotatably supported on an inner peripheral wall of the guide frame 10. Fitted over the inner peripheral wall of the guide frame 10 and secured thereto by a stop pin 19 is the magnet support ring 14B. The magnet support rings 14A and 14B retain, respectively, first and second annular arrays of magnets 14a and 14b juxtaposed to the ferromagnetic plates 25. Preferably, each of the magnet arrays 14a and 14b are arranged with the same array pitch p as the ferromagnetic plates 25 so that polarities with respect to the ferromagnetic plates 25 are different peripherally and alternately.

In a preferred arrangement, three fluid pressure actuators (not shown) are connected in peripherally equally spaced relation to the left end wall of the guide frame 10. Each fluid pressure actuator has a piston inserted in a cylinder and an attached rod is connected to an arm projecting from the magnet support ring 14A through a slit in the left end wall of the guide frame 10. Such a construction is disclosed in Japanese Patent Application Laid-Open No. 12659/1992 publication.

Figure 4:
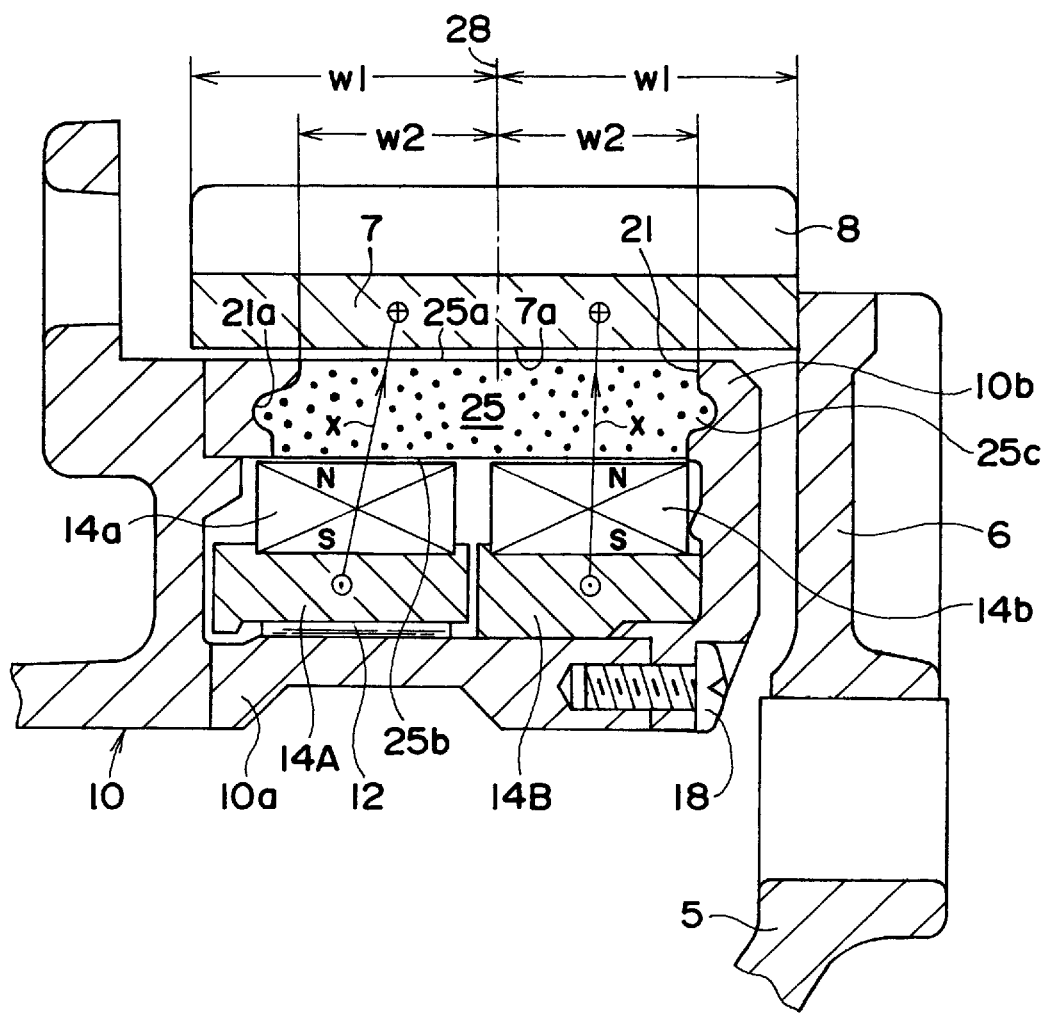
FIG. 4 is a sectional front view of a brake drum according to the invention.

As shown in FIG. 4, an outer surface 25a and an inner surface 25b of each ferromagnetic plate 25 are displaced relatively in a direction parallel to an axis of the brake drum 7. Also, an axial center of the outer surface 25a of each ferromagnetic plate 25 is substantially radially aligned with an axial center of an inner surface 7a of the brake drum 7. More specifically, each ferromagnetic plate 25 is substantially a parallelogram in section and is configured such that an axial center line 28 of an outer surface 25a having a width of 2×w2 and juxtaposed to the inner surface 7a of the brake drum 7 is radially aligned with an axial center line of the inner brake drum surface 7a having a width of 2×w1. Preferably, the width of the inner surface 25b of each ferromagnetic plate 25 has a dimension to completely cover the adjacent magnets 14a and 14b. However, this width is determined according to the dimension of the free space defined by the guide frame 10 or the magnet support rings 14A and 14B.

As shown in FIG. 4, a groove 21a is formed in each side wall surface of each opening 21 of the guide frame 10. Engaging each groove 21a is a protrusion 25c formed on lateral edges of the ferromagnetic plates 25 so that the plates 25 are securely retained in the tubular body 10b. The guide frame 10 includes an annular plate constituting a left end wall, the inverted L shaped tubular body 10b, and a tubular body 10a connected by means of a number of bolts 18 and all formed of a non-magnetic material, such as aluminum. As also shown in FIG. 4, the inner end of the brake drum 7 is connected to the spokes 6 radially extending from the boss portion 5, the axial center of the outer surface 25a of each ferromagnetic plate 25 is slightly displaced from the axial center of the brake drum 7 toward the inner end of the brake drum 7 which is connected to the spokes 6. In cases in which there is sufficient space at the open outer end of the brake drum 7, it is preferred that the width of the brake drum 7 is increased to enlarge its heat radiating area. Then, the axial center of the outer peripheral surface 25a of the ferromagnetic plates 25 is slightly displaced from the axial center of the brake drum 7 toward the open outer end thereof in consideration of a difference of the heat diffusion characteristics between the outer and the inner ends of the brake drum 7.

OPERATION

The operation of the present invention will be described hereinafter.

Figure 2:
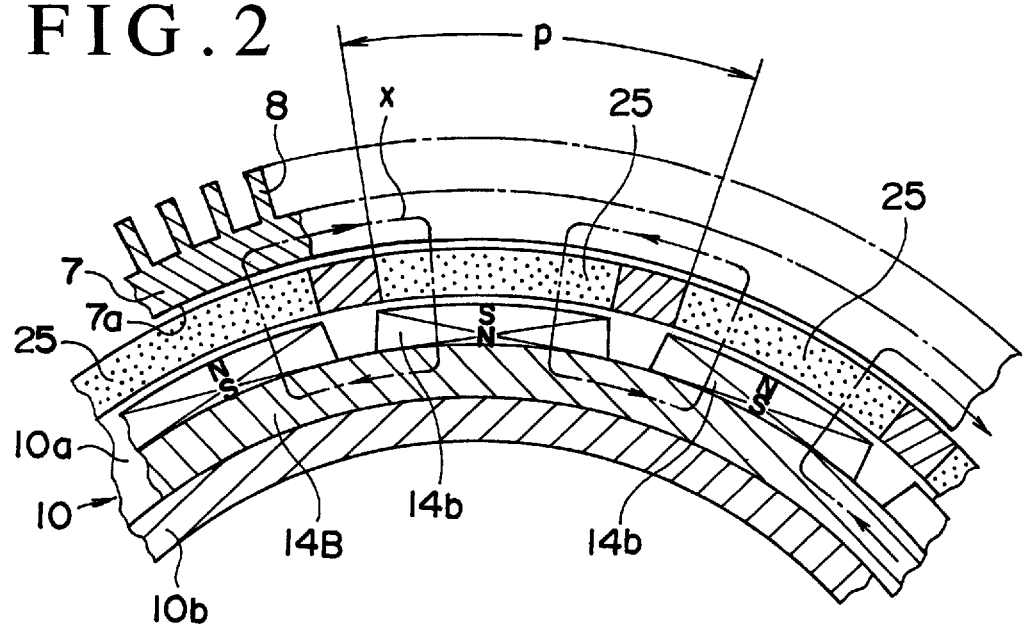
FIG. 2 is a sectional side view taken on line 2A—2A of FIG. 1 and showing a braking condition for the eddy current type device.
Figure 3:
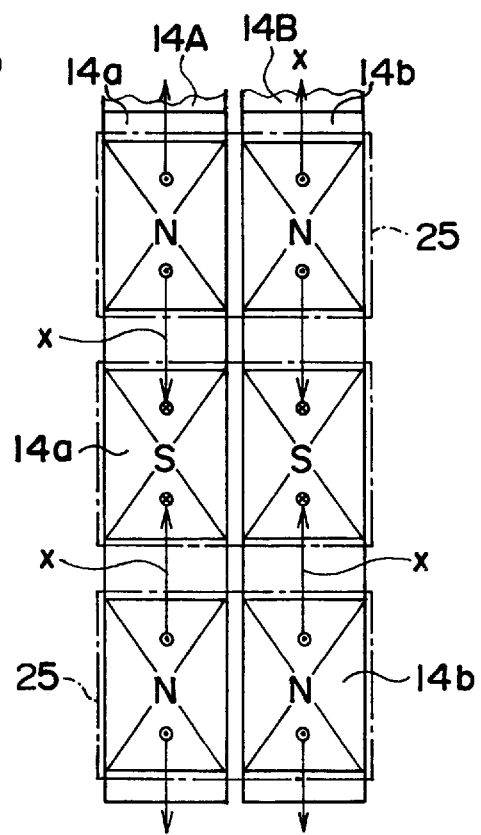
FIG. 3 is a developed plan view showing a relationship between ferromagnetic pole piece plates and magnet support rings in a braking condition.

As shown in a braking condition of FIGS. 2 and 3, pairs of magnets 14a and 14b having the same polarity are opposed to each common ferromagnetic plate 25, and a magnetic circuit x is produced from the magnets 14a and 14b through the common plate 25, the brake drum 7, the adjacent ferromagnetic plate 25 and the adjacent magnets 14a and 14b to the magnet support rings 14A and 14B. When the rotating brake drum 7 crosses a magnetic field generated by the magnets 14a and 14b via the ferromagnetic plates 25, an eddy current circulating in the brake drum 7 produces a braking torque. During the braking condition, the magnetic field provided by the magnets 14a and 14b is oriented so as to be slightly moved by the plates 25 toward the axial center line 28 of the brake drum 7. Accordingly, the heat generated by the eddy current is substantially uniformly distributed in the axial direction of the brake drum 7. Thus, the temperature of the brake drum 7 is rendered substantially uniform to reduce the possibility of deformation of the brake drum 7 as a result of localized overheating.

In a non-braking condition, the magnet support ring 14A is rotated by the fluid pressure actuators a distance corresponding to the array pitch p of the ferromagnetic plates 25. Accordingly, two magnets 14a and 14b having different polarities are opposed to each common ferromagnetic plate 25, as shown in FIG. 1. A shorted magnetic circuit y is produced between the ferromagnetic plates 25 and the magnet support rings 14A, 14B and the magnets 14a and 14b do not produce a magnetic field on the brake drum 7.

In summary, the outer surface 25a and the inner peripheral surface 25b of each ferromagnetic plate 25 are axially displaced from each other in a direction parallel to the axis of the brake drum 7 such that the axial center of the outer surface 25a substantially coincides with the axial center of the brake drum 7. In that way, the heat distribution in the brake drum 7 is made uniform to suppress possible deformation of the brake drum 7. While in the above-described embodiment, the magnet support ring 14A is forwardly and reversely rotated by fluid pressure actuators, it is to be understood that the magnet support ring 14A could be rotated by a motor or, alternatively, the magnet support ring 14A could be fixed and the guide frame 10 rotated to provide braking and non-braking conditions. In addition, the present invention is not limited to the above-described embodiment, but can be applied also to the eddy current type braking systems disclosed in Japanese Patent Application No. 88867/1992 and Japanese Patent Application No. 86061/1991.

Obviously, many modifications and variations of the present invention are possible in light of the above teachings. It is to be understood, therefore, that the invention can be practiced otherwise than as specifically described.

What is claimed is:

1. A vehicle braking system comprising:
    a rotatable brake drum coupled to a rotary shaft and having inner and outer ends and defining an annular inner drum surface;
    pole piece support means disposed adjacent to said brake drum;
    a plurality of annularly spaced apart ferromagnetic pole pieces retained by said pole piece support means, each said pole piece having an outer pole piece surface juxtaposed to said inner drum surface and an oppositely directed inner pole piece surface;
    magnet support means disposed adjacent to said pole piece support means;
    a plurality of annularly spaced apart permanent magnets retained by said magnet support means and juxtaposed to said inner pole piece surfaces;
    adjustment means for producing relative movement between said pole pieces and said permanent magnets; and
    said system being characterized whereby said inner pole piece surface of each said pole piece is displaced from said outer pole piece surface thereof in a direction parallel to a rotational axis of said brake drum.

2. A system according to claim 1 wherein said inner drum surface has a substantially uniform width, said outer pole piece surfaces have substantially uniform widths, and an axial center of each said outer pole piece surface is substantially radially aligned with an axial center of said inner drum surface.

3. A system according to claim 2 including a plurality of spokes connecting said inner end of said brake drum to said rotary shaft, and wherein said inner pole piece surface of each said pole piece is displaced from said outer pole piece surface thereof toward said outer end of said brake drum.

4. A system according to claim 1 wherein said pole pieces are disposed between said inner drum surface and said permanent magnets.

5. A system according to claim 4 wherein said inner drum surface has a substantially uniform width, said outer pole piece surfaces have substantially uniform widths, and an axial center of each said outer pole piece surface is substantially radially aligned with an axial center of said inner drum surface.

6. A system according to claim 5 including a plurality of spokes connecting said inner end of said brake drum to said rotary shaft, and wherein said inner pole piece surface of each said pole piece is displaced from said outer pole piece surface thereof toward said outer end of said brake drum.

7. A system according to claim 1 wherein said permanent magnets comprise first and second arrays of annularly spaced apart permanent magnets, said first and second arrays being aligned in a direction parallel to said rotational axis.

8. A system according to claim 7 wherein said inner drum surface has a substantially uniform width, said outer pole piece surfaces have substantially uniform widths, and an axial center of each said outer pole piece surface is substantially radially aligned with an axial center of said inner drum surface.

9. A system according to claim 8 including a plurality of spokes connecting said inner end of said brake drum to said rotary shaft, and wherein said inner pole piece surface of each said pole piece is displaced from said outer pole piece surface thereof toward said outer end of said brake drum.

10. A system according to claim 7 wherein said pole pieces are disposed between said inner drum surface and said permanent magnets.

11. A system according to claim 10 wherein said inner drum surface has a substantially uniform width, said outer pole piece surfaces have substantially uniform widths, and an axial center of each said outer pole piece surface is substantially radially aligned with an axial center of said inner drum surface.

12. A system according to claim 11 including a plurality of spokes connecting said inner end of said brake drum to said rotary shaft, and wherein said inner pole piece surface of each said pole piece is displaced from said outer pole piece surface thereof toward said outer end of said brake drum.

13. A system according to claim 7 wherein each of said first and second arrays comprises permanent magnets of annularly alternating polarity, and said adjustment means produces relative annular movement between said first array and both said pole pieces and said second array.

14. A system according to claim 13 wherein said inner drum surface has a substantially uniform width, said outer pole piece surfaces have substantially uniform widths, and an axial center of each said outer pole piece surface is substantially radially aligned with an axial center of said inner drum surface.

15. A system according to claim 14 including a plurality of spokes connecting said inner end of said brake drum to said rotary shaft, and wherein said inner pole piece surface of each said pole piece is displaced from said outer pole piece surface thereof toward said outer end of said brake drum.

16. A system according to claim 13 wherein said pole pieces are disposed between said inner drum surface and said permanent magnets.

17. A system according to claim 16 wherein said inner drum surface has a substantially uniform width, said outer pole piece surfaces have substantially uniform widths, and an axial center of each said outer pole piece surface is substantially radially aligned with an axial center of said inner drum surface.

18. A system according to claim 17 including a plurality of spokes connecting said inner end of said brake drum to said rotary shaft, and wherein said inner pole piece surface of each said pole piece is displaced from said outer pole piece surface thereof toward said outer end of said brake drum.

* * * * *

UNITED STATES PATENT AND TRADEMARK OFFICE
CERTIFICATE OF CORRECTION

PATENT NO. : 5,855,256
DATED      : January 5, 1999
INVENTOR(S): Tohru Kuwahara

It is certified that error appears in the above-identified patent and that said Letters Patent is hereby corrected as shown below:

On title page item [54],

BREAKING is incorrect and should read --BRAKING--.

Column 1, line 2, BREAKING is incorrect and should read --BRAKING--.

Signed and Sealed this

Thirtieth Day of March, 1999

Attest:

Q. TODD DICKINSON

Attesting Officer

Acting Commissioner of Patents and Trademarks